United States Patent [19]
Tsuji et al.

[11] Patent Number: 4,983,017
[45] Date of Patent: Jan. 8, 1991

[54] OPTICAL HEAD DEVICE FOR READING INFORMATION STORED IN A RECORDING MEDIUM

[75] Inventors: Shigeki Tsuji; Taizo Yokota, both of Higashihiroshima, Japan

[73] Assignee: Sharp Kabushiki Kaisha, Osaka, Japan

[21] Appl. No.: 385,457

[22] Filed: Jul. 26, 1989

[30] Foreign Application Priority Data

Aug. 2, 1988 [JP] Japan .................................. 63-193660
Aug. 2, 1988 [JP] Japan .................................. 63-193661

[51] Int. Cl.$^5$ .......................... G02B 5/18; G02B 27/44
[52] U.S. Cl. .......................... 350/162.17; 350/162.11; 369/44.11; 369/109; 369/44.21
[58] Field of Search ................ 350/3.72, 3.73, 162.15, 350/162.17, 162.2, 162.11; 369/44, 45; 396/109

[56] References Cited

U.S. PATENT DOCUMENTS

| 4,458,980 | 7/1984 | Ohki et al. | 350/3.73 |
| 4,695,992 | 9/1987 | Aoi | 369/44 |
| 4,731,772 | 3/1988 | Lee | 350/3.72 |
| 4,787,076 | 11/1988 | Deguchi et al. | 369/44 |
| 4,885,734 | 12/1989 | Yuzo | 350/162.2 |

FOREIGN PATENT DOCUMENTS 62-270034 11/1987 Japan .

Primary Examiner—Bruce Y. Arnold
Assistant Examiner—Martin Lerner

[57] ABSTRACT

An optical head device for reading information stored in a recording medium wherein a light beam from a light source converges onto an optical disk and a beam reflected from the optical disk is received by a light receiving element to read information stored on the optical disk. This device includes a diffraction element having first diffraction gratings for dividing the light beam from the light source into a zero order diffracted beam utilized for reading the information stored on the optical disk and a pair of first order diffracted beams utilized for reading tracking errors. The diffraction element also has second diffraction gratings for guiding the beam reflected from the optical disk to a light receiving element. The transmission factors of the zero order diffracted beam of the first and/or second diffraction gratings in the regions located in the vicinity of both ends of the diffraction element are lower than those of the first and/or second diffraction gratings in the regions located in the vicinity of the center of the diffraction element. The ends and center are set in a direction corresponding to the radial direction of the optical disk.

23 Claims, 13 Drawing Sheets

ZERO-ORDER LIGHT
TRANSMISSION
FACTOR (%)

OPTICAL HEAD DEVICE FOR READING INFORMATION STORED IN A RECORDING MEDIUM

FIELD OF THE PRESENT INVENTION

The present invention relates to an optical head device for reading out various high-density information stored on an optical disk.

BACKGROUND OF THE PRESENT INVENTION

In an optical head device for reading information from an optical disk wherein a variety of high-density information is stored, the reading of information is performed by projecting a laser beam to produce a beam spot converging onto a arrow recording track and detecting a reflected beam therefrom.

FIG. 12 shows an example of the optical head device for reading information stored in a recording medium as mentioned above, in which a laser beam emitted from a laser beam source 1 passes through a diffraction grating 2 for producing a beam spot for tracking and is irradiated onto an optical disk 6 through a collimating lens 4 and an objective lens 5 after being reflected by a beam splitter 3. The beam reflected from the optical disk 6 is transmitted to the beam splitter 3 through the objective lens 5 and the collimating lens 4 and is incident upon a photodetector 8 through a plane-concave lens 7. The above reflected beam is converted into an electric signal by the photodetector 8.

FIG. 13 shows an example of a conventional optical head device wherein a diffraction element 9 comprising a holographic grating (hologram grating) is employed instead of the beam splitter 3. In this conventional optical head device, the laser beam source 1, the diffraction grating 2 are aligned with the collimating lens 4, the objective lens 5 and the like, while the photodetector 8 is placed by the side of the laser beam source 1 so that a beam reflected from the optical disk 6 is diffracted by the diffraction element 9 and guided to the photodetector 8.

In the conventional optical head device as shown in FIGS. 12 and 13, the laser beam is converged onto the optical disk 6 so as to have substantially the same width as that of a recording track 6a (the recording track 6a is hatched in FIG. 11, for convenience of explanation) as indicated by mark S of FIG. 11 and the recording track 6a tracked by a tracking servo-mechanism (not shown in the drawings), thereby reading information recording on the recording track 6a in accordance with the beam reflected therefrom.

Since the recording track 6a formed on the optical disk 6 has a very narrow width of 1 to 2 μm approx., not only is the laser beam to be irradiated onto the recording track 6a required to be converged into a small beam spot by the objective lens 5 having a high numerical aperture (NA), but also the beam spot must have a high luminous intensity. However, a drawback in the above method is realized in that an Airy ring indicated by mark S, is generated by a converged laser beam owing to the secondary maximum elements as well known by one skilled in the art. If the Airy ring extends to the adjacent recording tracks 6a, crosstalk will occur at the time of reading information stored on the optical disk.

An approach to solve the above problem is that as shown in FIG. 14(a), a grating face 2a of the diffraction grating 2 and a grating face 2b opposite thereto, which are shown in FIGS. 12 and 13, are respectively provided with a filter 10 mounted thereon. The filter 10 has a light transmitting section 10a the width of which is narrower than that of the laser beam to be transmitted therethrough. As shown in FIG. 14(b), the transmission factors of the zero other diffracted beam in the vicinity of both ends of the diffraction grating, (the ends set in a direction corresponding to the radial direction of the optical disk 6), are controlled with filter 10. These portions where the transmission factor of 0th order diffracted beam is controlled, are hatched in FIG. 14. This construction reduces the occurrence of crosstalk at the time of reading information recorded on the recording track 6a.

Such a filter 10 is generally produced by a metal vapor deposition. This production of the filter 10 by the vapor deposition is a complex manufacturing process as well as causing a high cost of production. Since an optical head device usually requires a large number of components; and therefore, the addition of the filter 10 further increases the number of components resulting in making the structure of the device complicated all the more.

SUMMARY OF THE PRESENT INVENTION

An object of the present invention is to provide an optical head device for reading information stored in a recording medium and capable of preventing the occurrence of crosstalk at the time of reading information recorded on a recording track without using a filter for controlling the Airy ring of a laser beam.

Another object of the present invention is to provide an optical head device for reading information stored in a recording medium, wherein a diffraction element having first diffraction gratings and second diffraction gratings in the same plane or a diffraction element having the first diffraction grating and the second diffraction grating respectively, deposited on the light source side and the optical disk side is employed thereby reducing the number of components thereof.

Still another object of the present invention is to provide an optical head device for reading information stored in a recording medium, wherein to prevent the occurrence of crosstalk, a filter function for controlling the transmission factors of the zero order diffracted beam in the vicinity of both ends of the diffraction element. These ends are set in a direction corresponding to the radial direction of the optical disk. This filter function is realized by the first diffraction gratings and/or the second diffraction gratings instead of employing a filter produced by vapor deposition. This reduces the number of manufacturing processes as well as the production cost.

To achieve the foregoing objects, an optical head device for reading information stored in a recording medium according to the present invention is designed such that a light beam emitted from a light source is converged onto an optical disk and a light reflected from the optical disk is received by a light receiving element, thereby reading information stored on the optical disk. The present invention further uses a diffraction element comprising first diffraction gratings for dividing a light beam from the light source into a zero order diffracted beam utilized for reading information stored in the optical disk and a pair of first order diffracted beams for reading tracking errors and second diffraction gratings for guiding a beam reflected from the optical disk to the light receiving element. The first and second diffraction gratings are formed in the same plane.

The above diffraction element may be composed of a plurality of regions which are formed separately from each other in the same plane. A specified plurality of regions among the above regions comprises the second diffraction grating while the other regions comprise the first diffraction grating. A function of dividing a light beam into a zero order diffracted beam and first order diffracted beams, as well as, a filter function can be applied to the first diffraction gratings and/or the second diffraction gratings by changing the diffraction efficiency of zero order diffracted beam and first order diffracted beam at the regions of the first diffraction gratings and/or second diffraction gratings.

The transmission factors of the zero order diffracted beam of the first diffraction gratings and/or the second diffraction gratings, in the regions located in the vicinity of both ends of the diffraction element, (these ends being set in a direction corresponding to the radial direction of the optical disk), are arranged to be less than the transmission factors of the zero order diffracted beam of the first diffraction gratings and/or the second diffraction gratings in the regions located in the vicinity of the center of the diffraction element. This center is set in a direction corresponding to the radial direction of the optical disk. To give different transmission factors of the zero order diffracted beam to the aforementioned regions, i.e., the regions located in both ends and the center of the diffraction element, the depths of the second diffraction gratings in the regions located in the vicinity of both ends or one end of the diffraction element may be differentiated from the depths of the second diffraction gratings in the regions located in the vicinity of the center of the diffraction element. These ends and the center being set in a direction corresponding to the radial direction of the optical disk.

An optical head device for reading information stored is a recording medium according to the present invention comprises a diffraction element for guiding a beam reflected from the optical disk to the light receiving element, which is placed between the first diffraction grating positioned at the light source side and the optical disk on an optical path. The present invention also includes a second diffraction grating, the second diffraction grating being divided into a plurality of regions by parting lines which extend in a direction corresponding to the radial direction of the optical disk and parting lines which extend in the direction of the alignment of pits disposed in the optical disk. The transmission factors of the zero order diffracted beam at the second diffraction grating regions located in the vicinity of both ends of the diffraction element, (these ends being set in a direction corresponding to the radial direction of the optical disk), are arranged to be less than the transmission factors of the zero diffracted beam at the second diffraction grating regions located in the vicinity of the center of the diffraction element. This center is set in a direction corresponding to the radial direction of the optical disk.

Further, an optical head device for reading information stored ini a recording medium according to the present invention comprises a diffraction element placed between the light source and the optical disk in the optical path. The diffraction element comprises a first diffraction grating for dividing a light beam from the light source into a zero order diffracted beam utilized for reading information stored on the optical disk and a pair of first order diffracted beams for reading tracking errors, at one surface thereof opposing to the light source and the second diffraction grating for guiding a reflected beam from the optical disk to the light receiving element, at the other surface thereof opposing the optical disk. The above second diffraction grating may comprise a plurality of regions separated from each other, if necessary. In this case, the transmission factors of the zero order diffracted beam at the second diffraction grating regions located in the vicinity of both ends of the diffraction element are arranged to be less than the transmission factors of the zero order diffracted beam at the second diffraction grating regions located in the vicinity of the center of the diffraction element, these ends and center being set in a direction corresponding to the radial direction of the optical disk.

For a better understanding of the nature and advantages of the present invention, reference should be made to the following detailed description taken in conjunction with the accompanying drawings.

BRIEF DESCRIPTION OF THE DRAWINGS

FIG. 1 is an enlarged perspective view of a diffraction element, a photodetector and others which compose a typical example of the essential part of an optical head device for reading information stored in a recording medium.

FIG. 2(a) shows a diffraction element.

FIG. 2(b) is a graph showing the distribution of the transmission factors of the zero order diffracted beam for the diffraction element.

FIG. 3 is a schematic view showing the whole structure of the optical head device for reading information stored in a recording medium.

FIG. 4 illustrates the relationship between an objective lens and an optical disk.

FIGS. 6 to 8 show still another embodiment of the present invention.

FIG. 6 is an enlarged perspective view of a diffraction element, a photodetector and others which compose a typical example of the essential part of an optical head device for reading information stored in a recording medium.

FIG. 8 is a schematic view showing the structure of the optical head device for reading information stored in a recording medium.

FIG. 9 shows a further embodiment of the present invention.

DESCRIPTION OF THE EMBODIMENTS

With reference to FIGS. 1 to 4, an embodiment of the present invention will be explained below.

Figure 3:
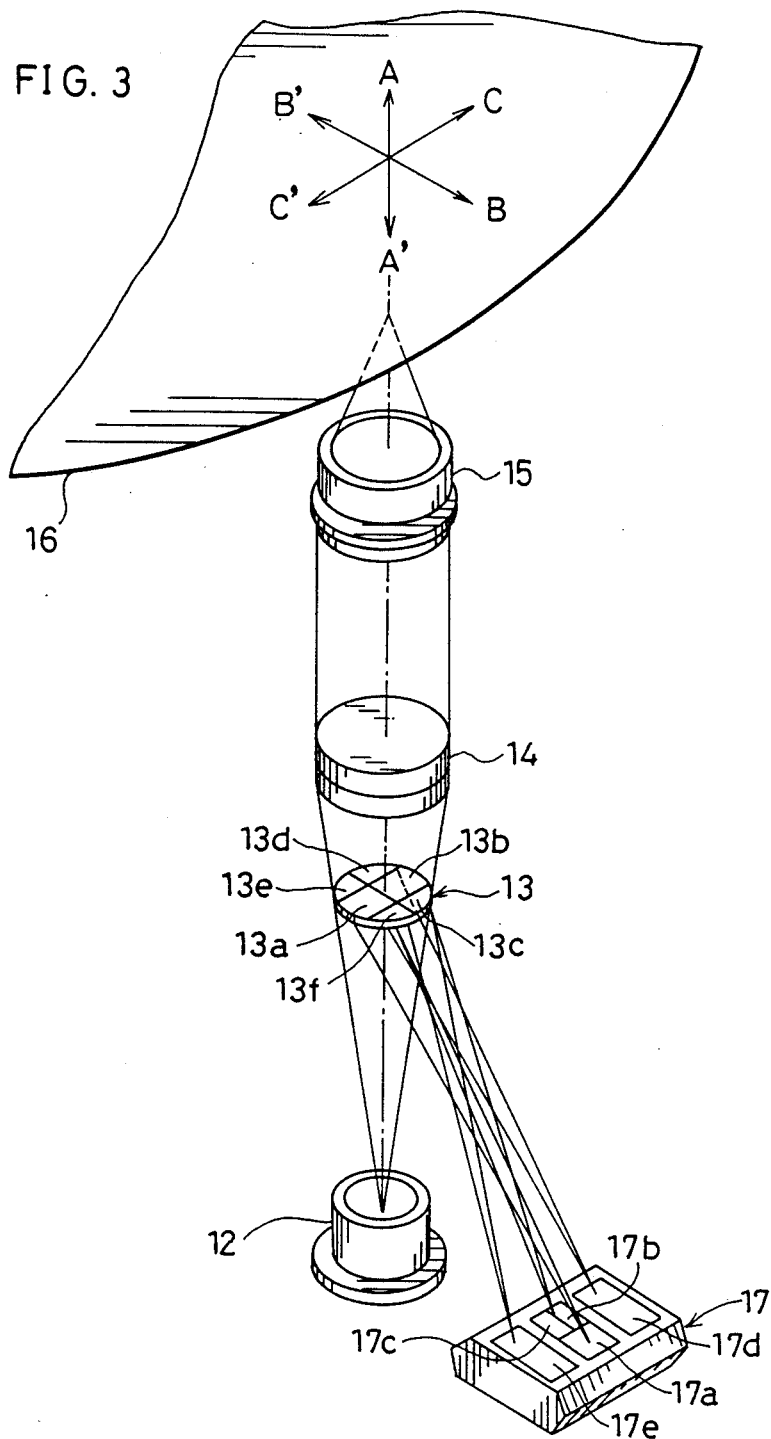
Figure 4:
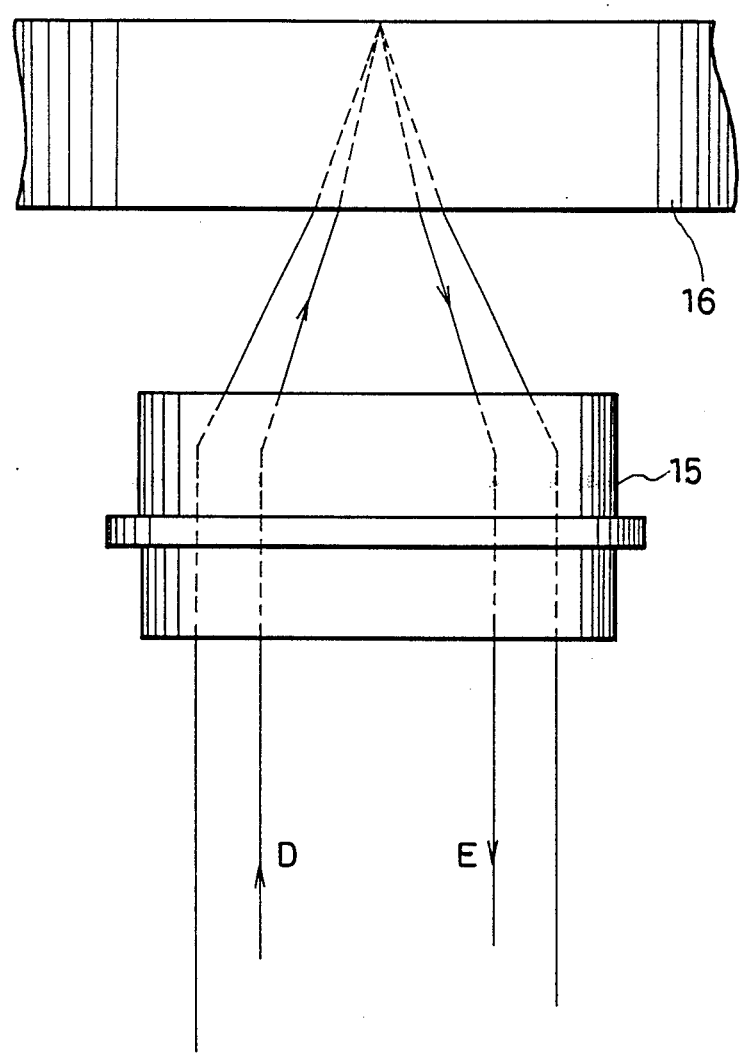

As shown in FIG. 3, the optical head device for reading information stored in a recording medium of the present invention comprises a laser beam source 12 as a light source and is designed such that a light beam emitted from a chip 12a of the laser beam source 12 (see FIG. 1) converges onto an optical disk 16 after passing through a diffraction element 13, a collimating lens 14 and an objective lens 15.

The beam reflected from the optical disk 16 passing through the objective lens 15 and the collimating lens 14 is incident upon the diffraction element 13 and is then guided from the diffraction element 13 to a photodetector 17 which has a function of a light receiving element for detecting of tracking errors and focusing errors, as well as, reading information stored on the optical disk 16. In FIG. 3, arrows A—A' and B—B' represent the focusing direction and the radial direction, respectively, and arrow C—C' represents the tangential direction, i.e., the direction of the alignment of the pits formed on the optical disk 16.

Figure 1:
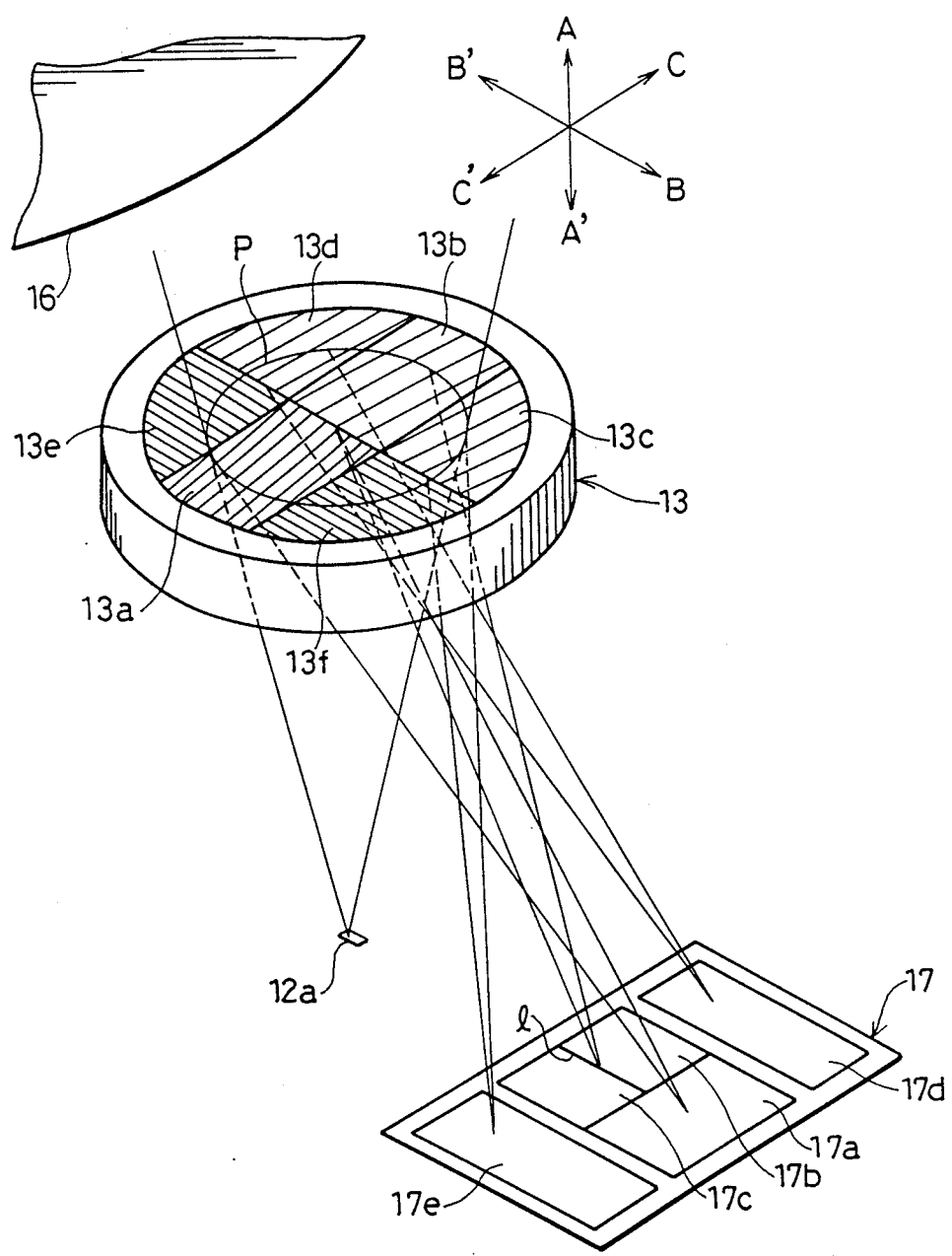
FIGS. 1 to 4 show one embodiment of the present invention.
Figure 2:
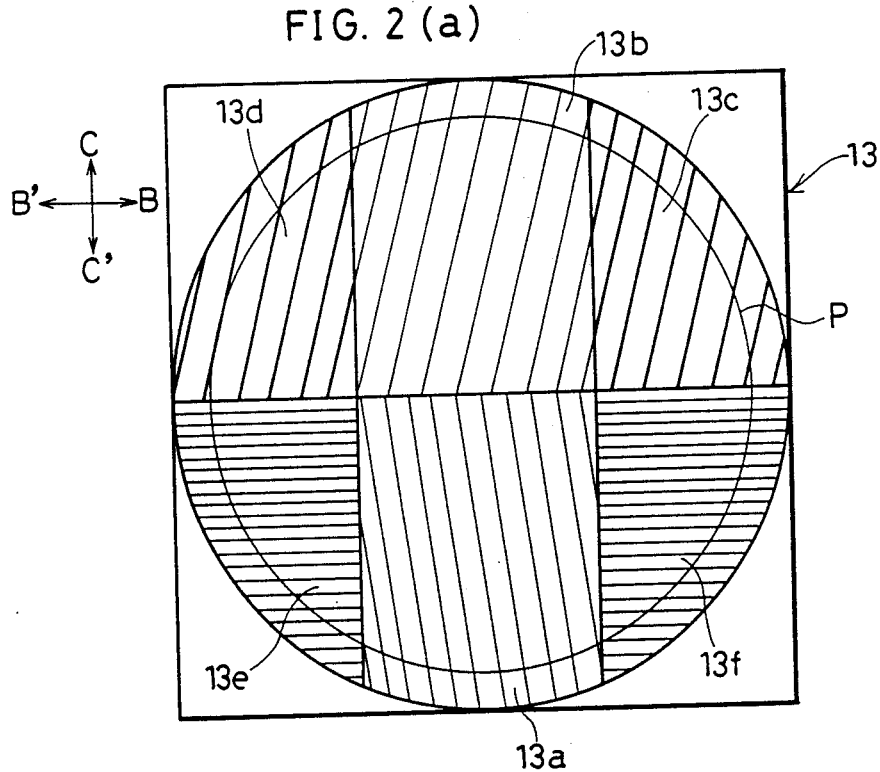
Figure 2:
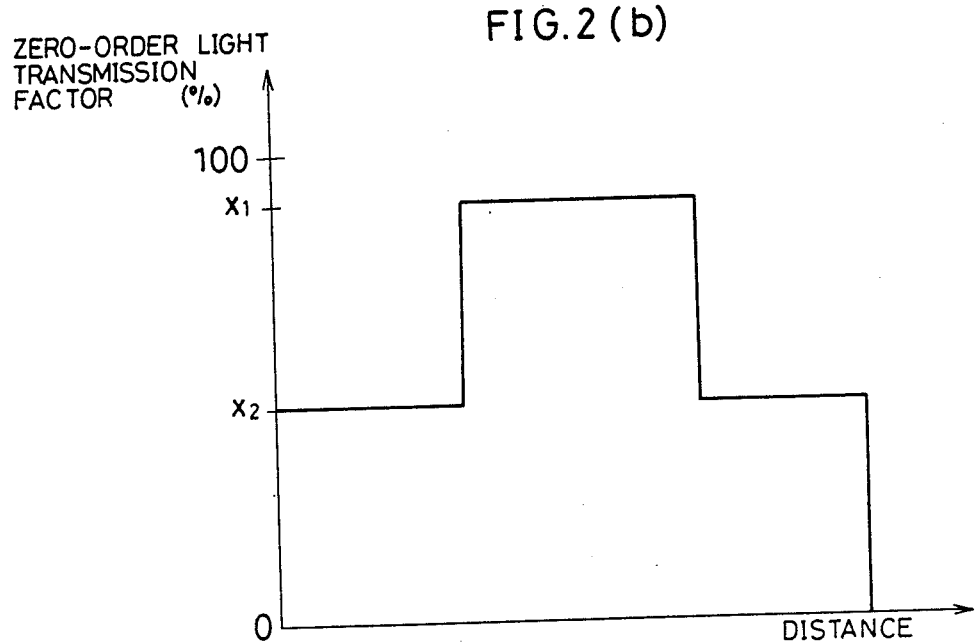

As shown in FIGS. 1 and 2(a), the photodetector 17 comprises five independent photodetecting sections, 17a to 17e. The diffraction element 13 is made of a plastic or glass and comprises six regions, 13a to 13f, which are formed separately from each other in the same plane. Among these six regions, four regions, 13a to 13d, each comprise a second diffraction grating while other two regions, 13e and 13f, each comprise a first diffraction grating. These first and second diffraction gratings, respectively, formed in the regions, 13a to 13f, are positioned at the surface of the diffraction element 13 opposing to the collimating lens 14. Mark P in FIG. 2(a) indicates the outmost area of the light beam which is to pass through the diffraction element 13.

The functions of the first/second diffraction gratings in the regions, 13a to 13f, in the diffraction element 13 will explained below. The light beam that has been emitted from the chip 12a of the laser beam source 12 and has passed through the second diffraction grating in the region 13a is divided into a zero order diffracted beam and first order diffracted beams. This zero order diffracted beam passes through the collimating lens 14 by which a parallel light beam is produced. This parallel light beam is irradiated onto the pits of the optical disk 16 by the objective lens 15. The zero order diffracted beam produced at the region 13a has a tilt angle in a specified range with respect to the optical disk 16 after passing through the objective lens 15 as indicated by arrow D of FIG. 4 and is reflected at the same angle as the incident angle thereof as indicated by arrow E. Thereafter, the reflected beam passes through the objective lens 15 and the collimating lens 14 and then reaches the surface of the second diffraction grating in the region 13b of the diffraction element 13.

The beam reflected from the optical disk 16 is divided by the second diffraction grating in the region 13b into a zero order diffracted beam to be projected back to the laser beam source 12 as it is and first order diffracted beams to be incident upon the photodetector 17. One of the first order diffracted beams produced by the second diffraction grating in the region 13b reaches on a parting line 1 between the photodetecting sections 17b and 17c of the photodetector 17 and then the information stored on the optical disk 16 is detected while the beam spot of the laser beam is moved along the optical disk 16 in compliance with the surface vibration of the optical disk 16 or the like by means of a focus servo-mechanism (not shown in the drawings).

The light beam that has been emitted from the laser beam source 12 and has passed through the second diffraction grating in the region 13b of the diffraction element 13 is divided into a zero order diffracted beam and first order diffracted beams. After being reflected by the optical disk 16, this zero order diffracted beam returns to the region 13a of the diffraction element 13 and is then diffracted by the second diffraction grating in the region 13a so as to be guided to the photodetecting section 17a of the photodetector 17, whereby information stored on the optical disk 16 is detected based on the diffracted beam received by the photodetecting section 17a.

The light beams that have been emitted from the laser beam source 12 and have reached the regions 13e and 13f of the diffraction element 13 are respectively divided into a zero order diffracted beam and ±first order diffracted beams utilized for detecting tracking errors by the first diffraction gratings in the regions 13e and 13f. After being reflected by the optical disk 16, these first diffracted beams return to the regions 13c and 13d of the diffraction element 13 and are then diffracted by the second diffraction gratings in the regions 13c and 13d so as to be guided to the photodetecting sections 17e and 17d of the photodetector 17. In accordance with the diffracted beams received by the photodetecting sections 17e and 17d, the beam spot of the laser beam is controlled by means of a tracking servo-mechanism (not shown in the drawings) to track a recording track on the optical disk 16.

The laser beams that have been emitted from the laser beam source 12 and have reached the regions 13c and 13d of the diffraction element 13 are diffracted by the second diffraction gratings in the regions 13c and 13d so that the luminous intensity of each of the zero order diffracted beams is decreased and these zero order diffracted beams reach the optical disk 16. Most of the diffracted beams reflected by the optical disk 16 do not diverge to the photodetector 17 but reach the first diffraction gratings in the regions 13e and 13f of the diffraction element 13.

The first diffraction gratings and the second diffraction gratings in the regions 13a to 13f are designed such that the transmission factor of the zero diffracted beam derived from the light beam which has been emitted from the laser beam source 12 and has passed through the diffraction element 13 in the foregoing process is high at the second diffraction gratings in the regions 13a and 13b located in the vicinity of the center of the diffraction element 13 as shown in FIG. 2(b) and is low at the second diffraction gratings in the regions 13c and 13d and the first diffraction gratings in the regions 13e and 13f compared with that at the second diffraction gratings in the regions 13a and 13b, the regions 13c to 13f being located in the vicinity of both ends of the diffraction element 13. The above mentioned center and ends of the diffraction element 13 are set in a direction corresponding to the radial direction of the optical disk (B—B').

As described above, the distribution of the luminous intensity of the light beam at the time when it passes through the diffraction element 13 is equivalent to the distribution of the luminous intensity of the light beam which has passed through the conventional diffraction grating with the filter 10 mounted thereon. Hence, the occurrence of crosstalk can be prevented when information stored on the optical disk 16 is detected.

In this embodiment, a desired filter function can be applied to the first diffraction gratings in the regions 13e and 13f by changing the diffraction efficiency of zero order diffracted beam and first order diffracted beam. The diffraction gratings, hence, have both a function of dividing a light beam into a zero order diffracted beam and first order diffracted beams, as well as, a filter function.

The second diffraction gratings in the regions 13c and 13d respectively have the same function as that of the second diffraction grating in the region 13b, but the diffraction efficiency of zero order diffracted beam and first diffracted beam can be set to a desired value by simply changing the depths of the above second diffraction gratings. With the above method, it is possible to set the transmission factors of zero order diffracted beam of the second diffraction gratings in the regions 13c and 13d to be lower than that of the second diffraction grating in the region 13b. A desired filter function can also be accordingly applied to the second diffraction gratings in the regions 13c and 13d.

In the foregoing embodiment, the first diffraction gratings and the second diffraction gratings in the regions 13 to 13f of the diffraction element 13 are provided at the surface of the diffraction element 13, opposing the collimating lens 14, but it is also possible to provide the above first and second diffraction gratings at the opposite surface thereof.

Figure 5:
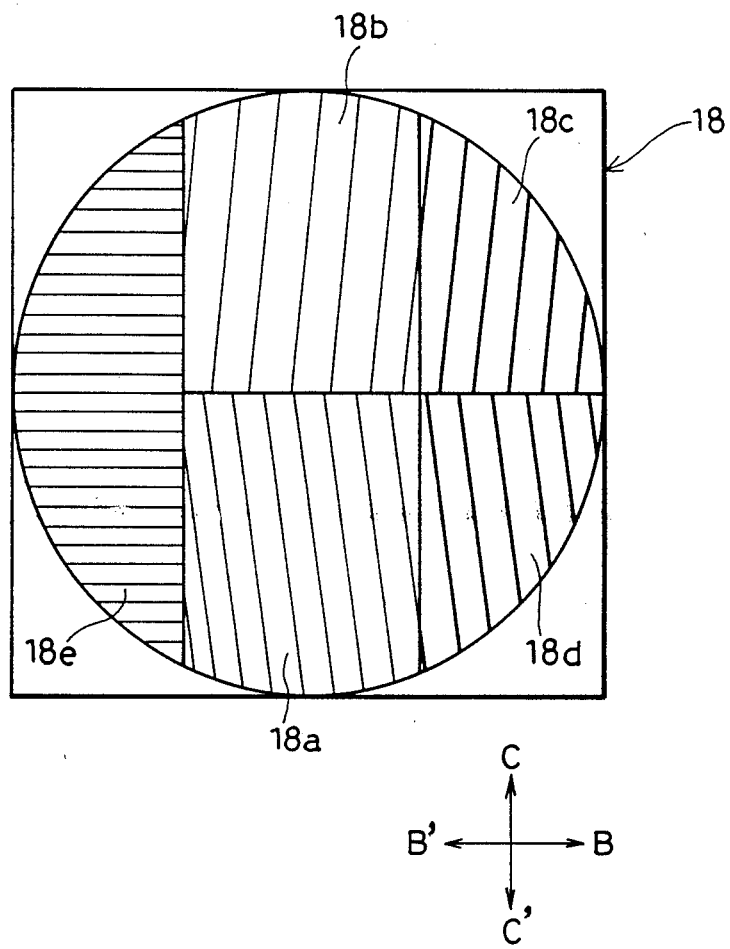
FIG. 5 shows a diffraction element in another embodiment of the present invention.

Referring now to FIG. 5, another embodiment of the present invention will be explained below.

A diffraction element 18 of this embodiment comprises five regions, 18a to 18e and four regions, 18a to 18d, among these regions, have a second diffraction grating and the other region 18e has a first diffraction grating.

Like the first embodiment, the laser beam which has been emitted from the laser beam 12 and has passed through the second diffraction grating in a region 18a is reflected at the optical disk 16 and then diffracted by the second diffraction grating in a region 18b so as to be guided to the photodetector 17. On the basis of the diffracted beam received by the photodetector 17, a focus servo-mechanism is controlled. On the other hand, the light beam which has passed throgh the second diffraction grating in the region 18b is reflected at the optical disk 16 and is then diffracted by the second diffraction grating in the region 18a so as to be guided to the photodetector 17. The information stored on the optical disk 16 is detected by the photodetector 17 based on the light beam received by the photodetector 17.

The light beam which has been emitted from the laser beam source 12 and has passed through the first diffraction grating in a region 18e is reflected at the optical disk 16 and then diffracted by the second diffraction gratings in the regions 18c and 18d of the diffraction element 18 so as to be guided to the photodetector 17. A tracking servo-mechanism is controlled based on the light beam received by the photodetector 17. On the other hand, the light beams which have passed through the second diffraction gratings in the regions 18c and 18d are reflected at the optical disk 16 and then reach the first diffraction grating in the region 18e.

In the optical head device for reading information stored in a recording medium of this embodiment, the transmission factor of the zero order diffracted beams to pass through the diffraction element 18 is lowered at the regions 18c to 18e located in the vicinity of both ends of the diffraction element 18, compared with the transmission factors of the same diffracted beam at the regions 18a and 18b located in the vicinity of the center of the diffraction element 18. The above ends and center are set in a direction corresponding to the radial direction of the optical disk 16 ( B—B' ). With such an arrangement, a filter function equivalent to that of the conventional diffraction grating with the filter 10 mounted thereon can be achieved by the diffraction element 18.

Figure 6:
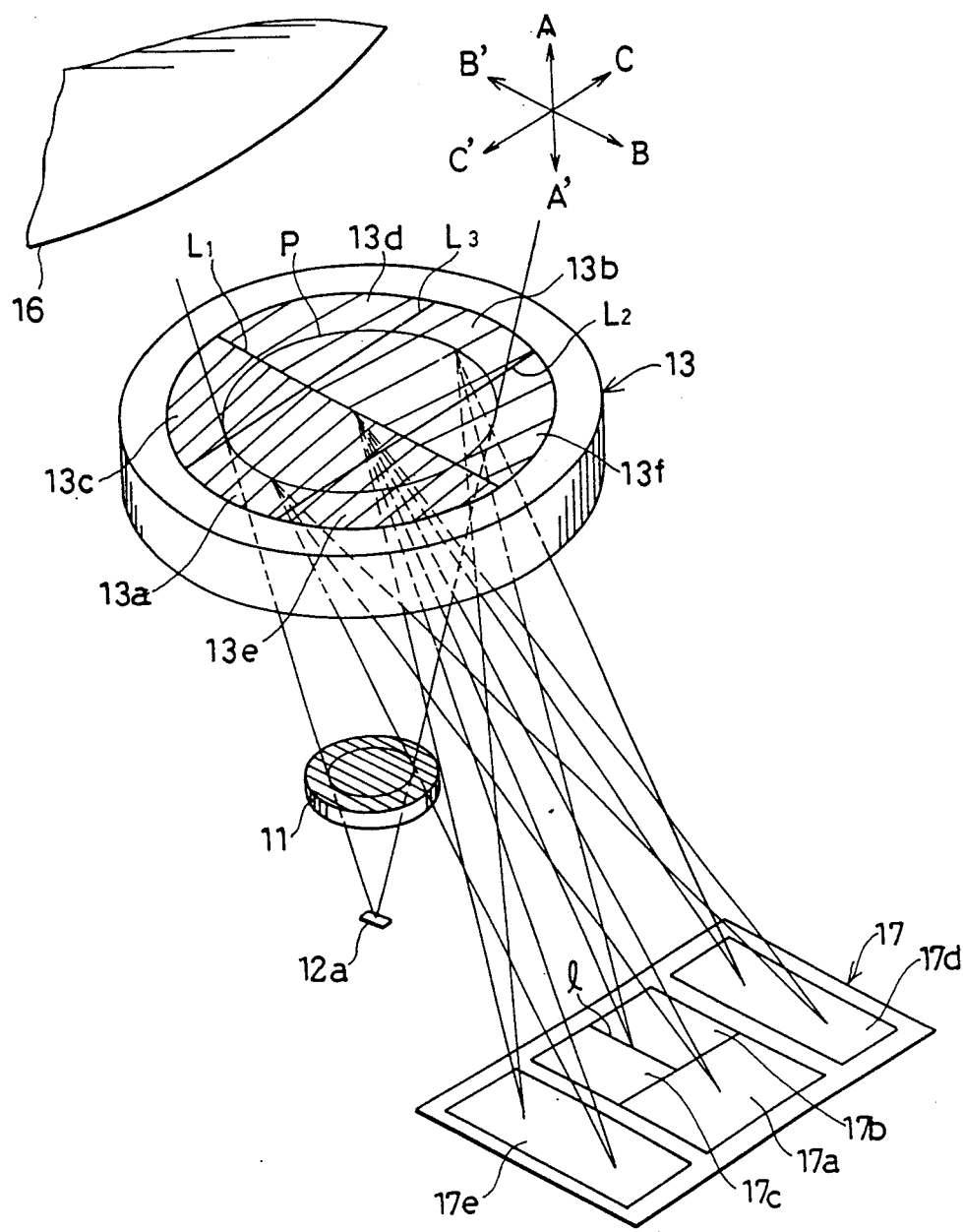
Figure 7A:
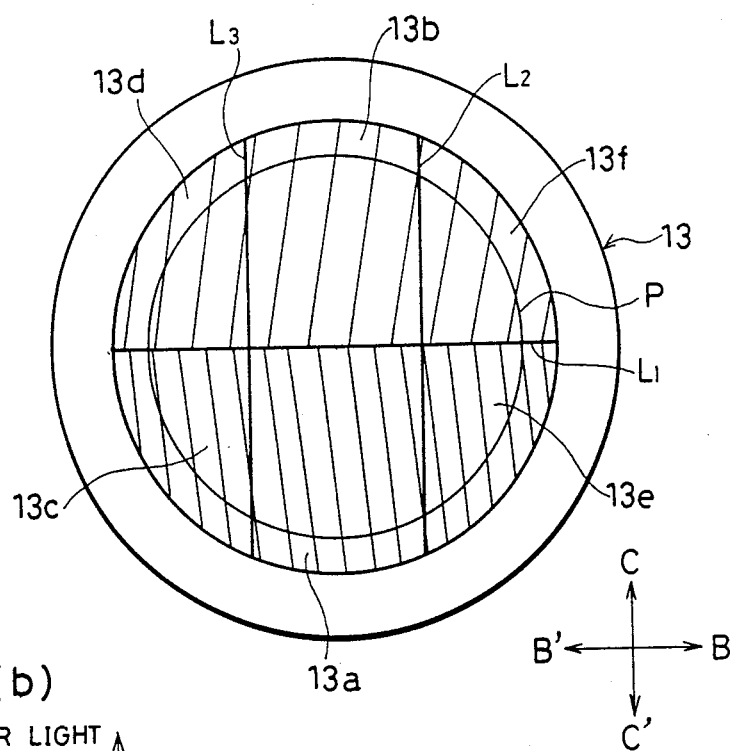
FIG. 7(a) shows a diffraction element.
Figure 7B:
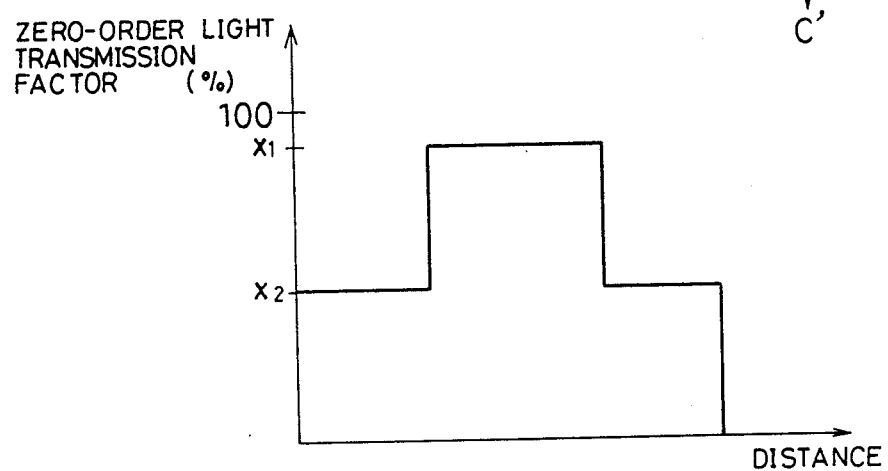
FIG. 7(b) is a graph showing the distribution of the transmission factors of the zero order diffracted beam in the diffraction element.
Figure 8:
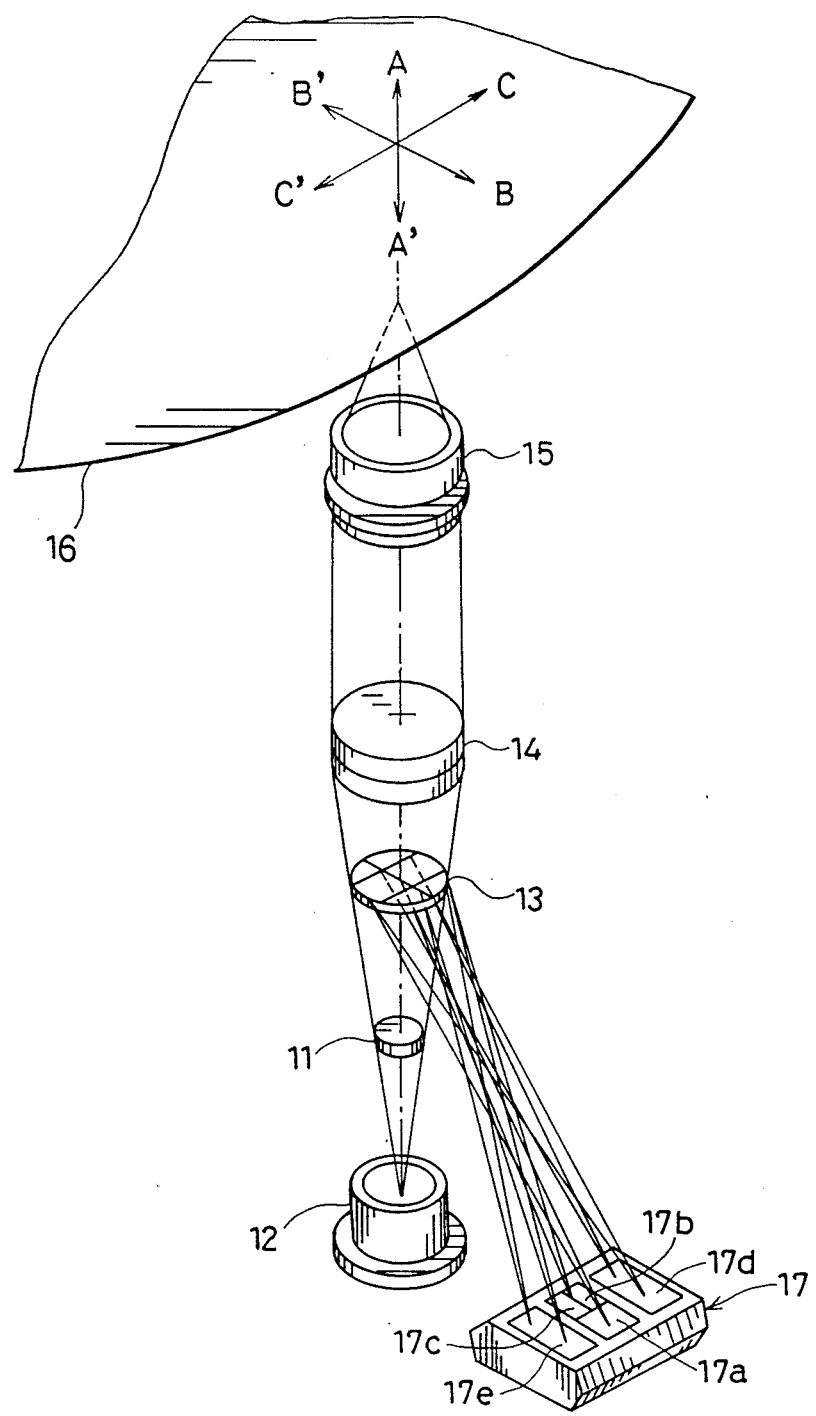

The following description will discuss still another embodiment of the present invention with reference to FIGS. 6 to 8. In this embodiment, parts having substantially similar functions to those of the parts which appear in the first embodiment are indicated by the same reference numerals and the description thereof is omitted.

In the optical head device for reading information stored in a recording medium of this embodiment, as shown in FIG. 8, a laser beam emitted from the chip 12a of the laser beam source 12 (see FIG. 6) serving as a light source, passes through a first diffraction grating 11, a diffraction element 13 having second diffraction gratings (hologram gratings), the collimating lens 14 and the objective lens 15 and converges onto the optical disk 16.

The beam reflected from the optical disk 16 is incident on the diffraction element 13 after passing through the objective lens 15 and the collimating lens 14, and is diffracted by the second diffraction grating of the diffraction element 13 so as to be guided to the photodetector 17 which serves as a light receiving element for detecting of tracking errors/focusing errors, and reading information stored on the optical disk 16.

As shown in FIGS. 6 and 7(a), the photodetector 17 has five independent photodetecting sections, 17a to 17e, formed separately from each other, while the diffraction element 13 has the second diffraction grating at the collimating lens 14 side thereof. This second diffraction grating is divided into six regions 13a to 13f by a parting line $L_1$ which extends in a direction corresponding to the radial direction of the optical disk 16 ( B—B' ) and two parting lines $L_2$ and $L_3$ which extend in a direction corresponding to the direction of the alignment of the pits formed in the optical disk 16 ( C—C' ). The diffraction element composed of the six regions, 13a to 13f, which are formed in the same plane is made of a plastic or glass. Mark P in FIG. 7(a) indicates the outmost part of the light beam to pass through the diffraction element 13.

As shown in FIG. 7(b), the second diffraction gratings in the regions 13a to 13f are arranged such that the transmission factors of the zero order diffracted beam of the second diffraction gratings in the regions 13c, 13d, 13e and 13f located in the vicinity of both ends of the diffraction element 13 are considerably lower than those of the second diffraction gratings in the regions 13a and 13b located in the vicinity of the center of the diffraction element 13. The above ends and center are set in a direction corresponding to the radial direction of the optical disk 16. The adjustment of the transmission factors can be achieved by changing the depths of the second diffraction gratings.

The following description will discuss the functions of the second diffraction gratings in the regions 13a to 13f of the diffraction element 13.

A light beam emitted from the laser beam source 12 is diffracted and divided by the first diffraction grating 11 into a zero order diffracted beam and a pair of first order diffracted beams. These diffracted beams are further divided by the second diffraction gratings in the regions 13a, 13c and 13e. The zero order diffracted beams among the diffracted beams produced at the above three regions are irradiated upon the pits on the optical disk 16 through the collimating lens 14 and the objective lens 15. The beams reflected from the optical disk 16 pass through the objective lens 15 and the collimating lens 14 to reach the second diffraction gratings in the regions 13b, 13d and 13f in the diffraction element 13. The regions 13a, 13c and 13e are located at one side of the diffraction element 13 and the regions 13b, 13d and 13f at the other side thereof when the diffraction element is divided by the parting line $L_1$.

The zero order diffracted beam which has been produced by the first diffraction granting 11 and has reached the regions 13b, 13d and 13f is divided thereat into a zero order diffracted beam and first order diffracted beams. One of the above first order diffracted beams reaches the parting line 1 between the photodetecting sections 17b and 17c in the photodetector 17. On the basis of the above first order diffracted beam that has reached the line 1, the beam spot of the laser beam is moved along the optical disk 16 in accordance with the surface vibration thereof by means of the focus servo-mechanism (not shown), thereby detecting information stored on the optical disk 16.

On the other hand, the pair of first order diffracted beams which have been produced by the first diffraction grating 11 and have reached the regions 13b, 13c and 13f in the diffraction element 13 after being reflected at the optical disk 16 are diffracted at the above regions to be guided into the photodetecting sections 17d and 17e of the photodetector 17 to be utilized for detecting tracking errors as described later, together with the diffracted beams guided into the photodetecting sections 17d and 17e from the regions 13a, 13c and 13e in the diffraction element 13.

The light beam which has been emitted from the laser beam source 12 and has passed through the second diffraction gratings in the regions 13b, 13d and 13f in the diffraction element 13 after being divided into a zero order diffracted beam and first order diffracted beams by the first diffraction grating 11 are reflected at the optical disk 16 and then projected back to the regions 13a, 13c and 13e in the diffraction element 13.

The zero order diffracted beam which has been produced by the first diffraction grating 11 and has reached the regions 13a, 13c and 13e is divided thereat into a zero order diffracted beam and first order diffracted beams. One of the above first order diffracted beams is guided into the photodetecting section 17a of the photodetector 17. The detection of information stored on the optical disk 16 is performed based on the diffracted beam received by the photodetecting section 17a.

On the other hand, the pair of first order diffracted beams that have been produced by the first diffraction grating 11 and have reached the regions 13a, 13c and 13e of the diffraction element 13 after being reflected at the optical disk 16 are diffracted in the above regions so as to be guided into the photodetecting sections 17d and 17e of the photodetector 17. On the basis of the diffracted beams guided into the photodetecting sections 17d and 17e of the photodetector 17 from the regions 13a, 13c and 13e and the aforementioned diffracted beams guided into the photodetecting sections 17d 17e from the regions 13b, 13c and 13f, the beam spot of the laser beam is moved along the recording track on the optical disk 16 by means of the tracking servo-mechanism (not shown).

As described earlier, the transmission factors of the zero order diffracted beam of the second diffraction gratings in the regions 13c, 13d, 13e, and 13f located in the vicinity of both ends of the diffraction element 13 are considerably lower than those of the second diffraction gratings in the regions 13a and 13b located in the vicinity of the center of the diffraction element 13. The above ends and center are set in a direction corresponding to the radial direction of the optical disk 16. Therefore, the occurrence of crosstalk caused by reading the information recorded on other tracks than a track from which desired information is to be read, can be prevented at the time of reading information stored on the optical disk 16.

Figure 9A:
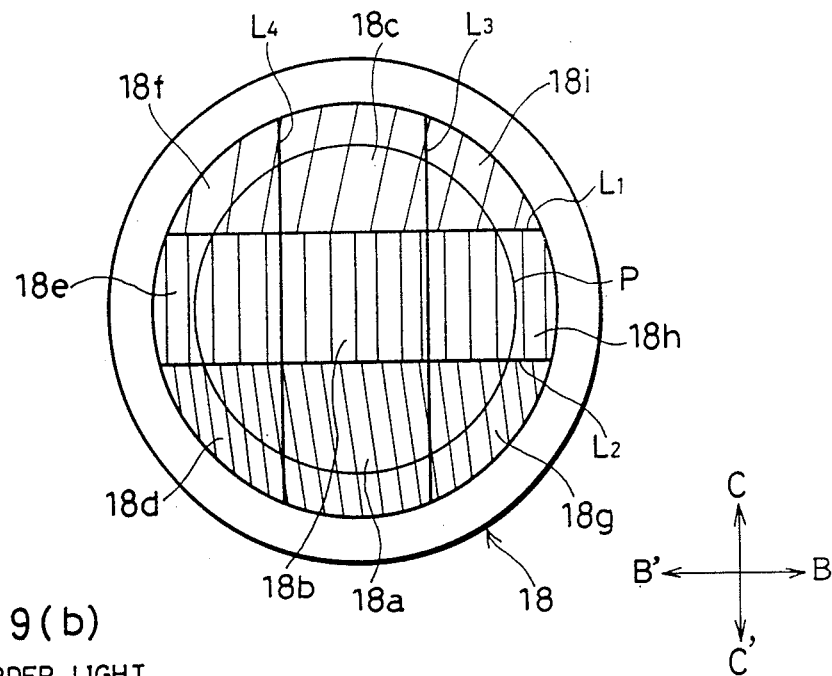
FIG. 9(a) shows a diffraction element and FIG. 9(b) is a graph showing the distribution of the transmission factors of the zero order diffracted beam in the diffraction element.
Figure 9B:
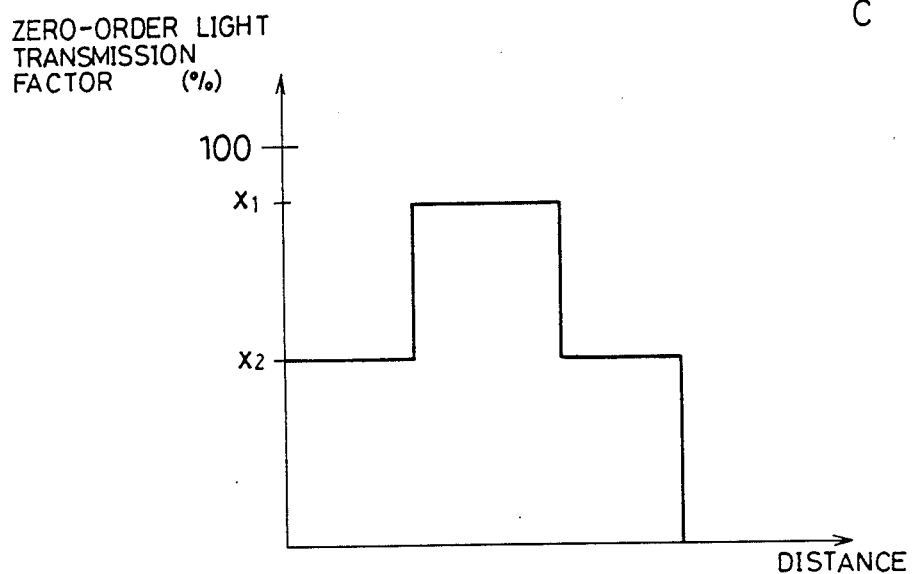

The following description will discuss a further embodiment of the present invention with reference to FIG. 9. As shown in FIG. 9(a), a diffraction element 18 in this embodiment comprises a second diffraction grating divided into nine regions 18a to 18i with two parting lines $L_1$ and $L_2$ which extend in a direction corresponding to the radial direction of the optical disk 16 and two parting lines $L_3$ and $L_4$ which extend in a direction corresponding to the direction of the alignment of the pits on the optical disk 16. As shown in FIG. 9(b), the second diffraction grating having the regions 18a to 18i is designed such that the transmission factors of the zero order diffracted beam in the regions 18d to 18f located in the vicinity of both ends of the diffraction element 18 are considerably lower than that in the regions 18a to 18c located in the vicinity of the center of the diffraction element 18. The above ends and center are set in a direction corresponding to the radial direction of the optical disk 16.

Figure 10:
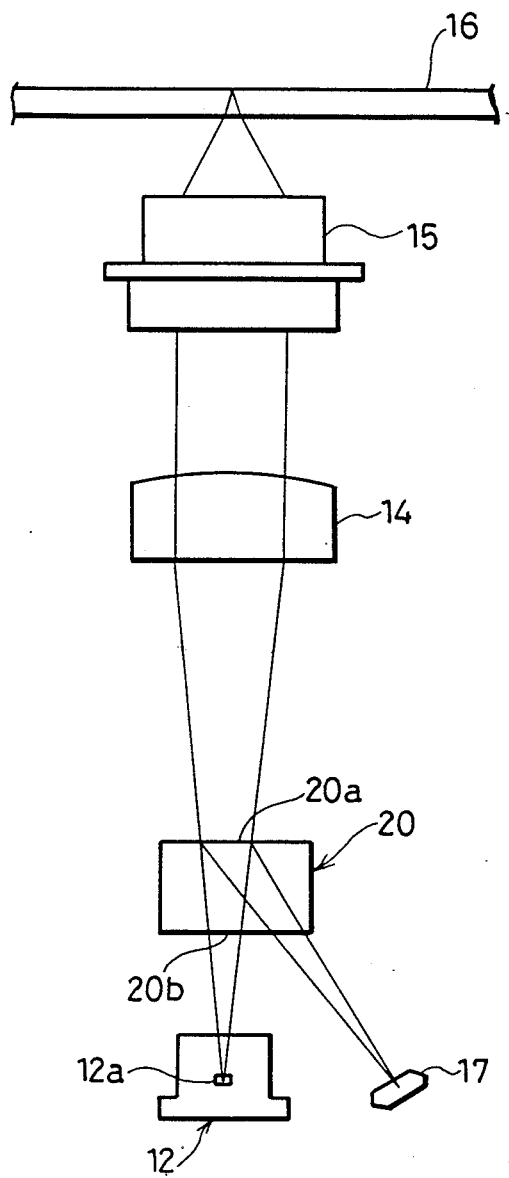
FIG. 10 shows a still further embodiment of the present invention and is a front view showing the structure of an optical head device for reading information stored in a recording medium.
Figure 11:
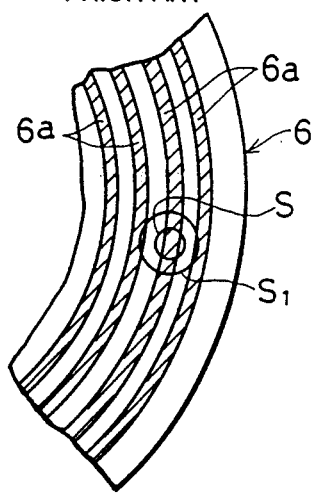
FIG. 11 illustrates the relationship between a recording track on an optical disk and a beam spot of a laser beam.
Figure 12:
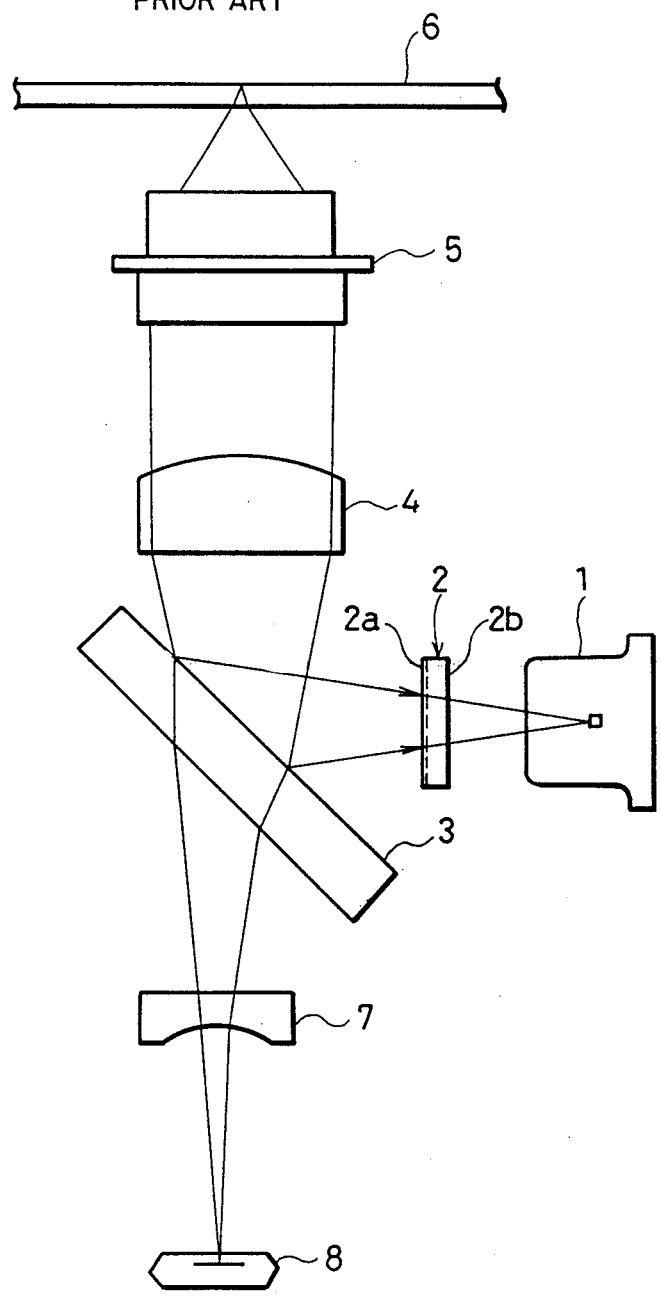
FIG. 12 is a front view showing the structure of a conventional optical head device.
Figure 13:
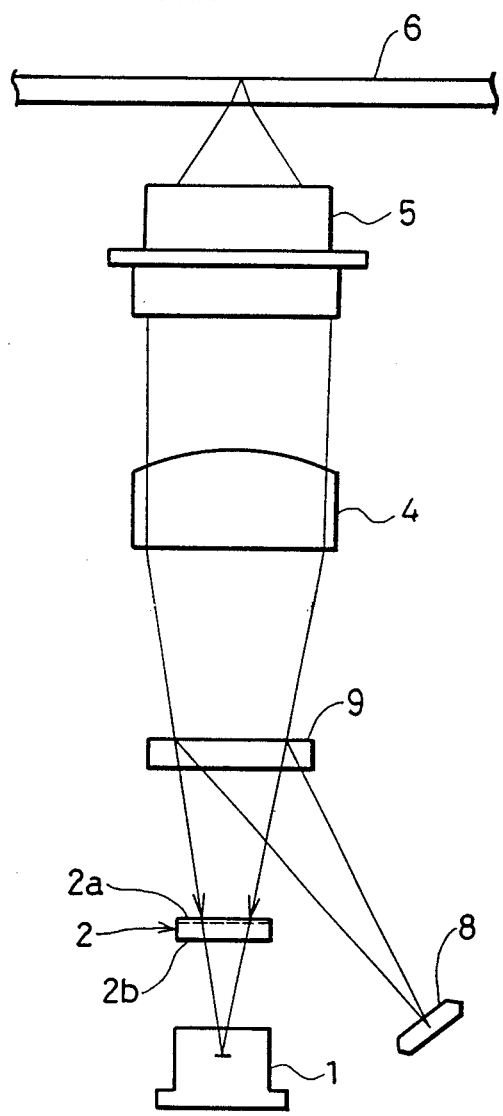
FIG. 13 is a front view showing the structure of another conventional optical head device.
Figure 14A:
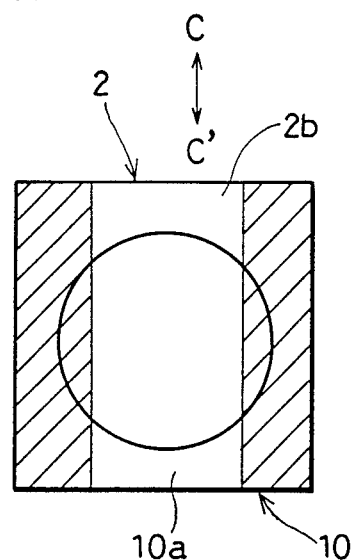
FIG. 14(a) illustrates the diffraction grating with a filter mounted thereon of the optical head device shown in FIGS. 12 and 13.
Figure 14B:
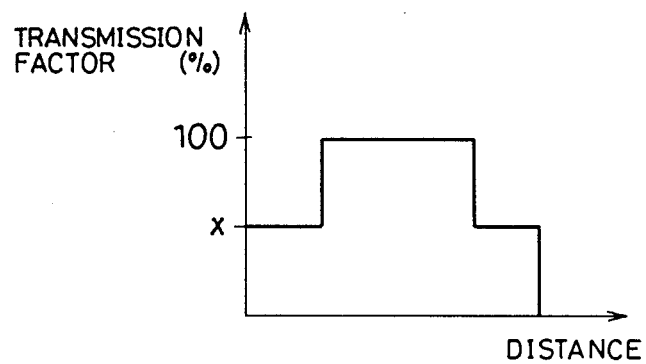
FIG. 14(b) is a graph showing the distribution of the transmission factors of the zero order diffracted beam in the diffraction grating shown in FIG. 14(a).

FIG. 10 shows another embodiment of the present invention. In the optical head device for reading information stored in a recording medium of this embodiment, a diffraction element 20 comprises a first diffraction grating and a second diffraction grating which are formed thereon. More particularly, a second diffraction grating 20a having the aforementioned filter function as well is formed at one surface of the diffraction element 20 opposing the collimating lens 14 and a first diffraction grating 20b at the other surface of the diffraction element 20 opposing the laser beam source 12. The second diffraction grating 20a may be divided into a plurality of regions if necessary and is designed such that the transmission factors of the zero order diffracted beam in the regions located in the vicinity of both ends of the diffraction element 20 are considerably lower than those in the regions located in the vicinity of the center of the diffraction element 20. The ends and center are set in a direction corresponding to the radial direction of the optical disk 16. In this embodiment, parts having substantially similar functions to those of the parts which appear in the first embodiment are indicated by the same reference numerals and the description thereof is omitted.

In the foregoing embodiments, the laser beam source 12 and the photodetector 17 are separately disposed, but it is also possible to employ a single element in which the laser beam source 12 and the photodetector 17 are combined thereby realizing the miniaturization of optical head device.

As described above, an optical head device for reading information stored in a recording medium according to the present invention wherein a light beam from a light source converges into an optical disk and a beam reflected from the optical disk is received by a light receiving element to read out information stored in the optical disk is characterized in a diffraction element comprising: first diffraction gratings for dividing the light beam from the light source into a zero order diffracted beam utilized for reading the information stored on the optical disk and a pair of first order diffracted beams utilized for reading tracking errors; and second diffraction gratings for guiding the beam reflected from the optical disk to the light receiving element, the first and second diffraction gratings being formed in the same plane. The above diffraction element comprises a plurality of regions formed separately from each other in the same plane and a specified plurality of regions among them have a second diffraction grating and the other regions have a first diffraction grating. The transmission factors of the zero order diffracted beam of the first and/or second diffraction gratings in the regions located in the vicinity of both ends of the diffraction element, (these ends being set in a direction corresponding to the radial direction of the optical disk), are lower than those of the first and/or second diffraction gratings in the regions located in the vicinity of the center of the diffraction element. This center is set in a corresponding direction to the radial direction of the optical disk.

Such a diffraction element comprising the first diffraction gratings and the second diffraction gratings formed in the same plane enables to reduce the number of components of the optical head device. In order to prevent the occurrence of crosstalk, the diffraction element itself is provided with the filter function. This also brings about an advantage such that there is no need to use a conventional separated filter and therefore the number of manufacturing process as well as the production cost can be reduced.

The depths of the second diffraction gratings in the vicinity of one or both ends, which are set in a direction corresponding to the radial direction of the optical disk, of the diffraction element are differentiated from the depths of those in the regions located in the vicinity of the center, which are set in a direction corresponding to the radial direction of the optical disk, of the diffraction element, whereby different transmission factors of the zero order diffracted beam can be easily given to the aforementioned regions.

Further, an optical head device for reading information stored in a recording medium according to the present invention comprises a diffraction element for guiding the beam reflected from the optical disk into the light receiving element placed between the first diffraction grating placed at the light source side and the optical disk on an optical path. The diffraction element includes the second diffraction gratings and is divided into a plurality of regions with parting lines which extend in a direction corresponding to the radial direction of the optical disk and parting lines which extend in a direction corresponding to the direction of the alignment of the pits in the optical disk.

Furthermore, an optical head device for reading information stored in a recording medium according to the present invention comprises a diffraction element placed between the light source and the optical disk on the optical path. The diffraction element includes a first diffraction grating for dividing the light beam from the light source into a zero order diffracted beam utilized for reading information stored on the optical disk and a pair of first order diffracted beams utilized for reading tracking errors, formed at one surface of the diffraction element opposing the light source and a second diffraction grating for guiding the reflected beam from the light source into a light receiving element, formed at the other surface of the diffraction element opposing the optical disk.

With such arrangements, not only can the number of components of the optical head device be reduced but also the filter function can be applied to the diffraction element itself resulting in the reduction of the number of manufacturing process as well as the production cost.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A diffraction element for an optical head device for reading information stored in a recording medium by utilizing a light beam from a light source which converges onto the recording medium and a beam reflected from the recording medium which is received by a light receiving element to read information stored on the recording medium, comprising:
   first diffraction grating means for dividing a portion of the light beam from the light source into a pair of first order diffracted beams utilized for reading tracking errors, and
   second diffraction grating means for producing from a remaining portion of the light beam from the light source a zero order diffracted beam utilized for reading the information stored on the recording medium and for guiding said pair of first order diffracted beams and said zero order diffracted beam reflected from the recording medium to the light receiving element;
said first and second diffraction grating means being positioned at different regions and being positioned in a same plane.

2. The diffraction element as claimed in claim 1 wherein said diffraction element further comprises:
   a plurality of regions which are separated from each other and formed in the same plane;
   said plurality of regions including,
      a specified number of regions having said second diffraction grating means, and
      a remainder of regions having said first diffraction grating means.

3. The diffraction element as claimed in claim 2 wherein said first diffraction grating means includes a divider for dividing a light beam into a zero order diffracted beam and first order diffracted beams and a filter for changing a diffraction efficiency of said zero order diffracted beam and said first order diffracted beams produced by said first diffraction grating means.

4. The diffraction element as claimed in claim 2 wherein said diffraction element comprises six regions formed in the same plane separate from each other;
   said diffraction element being constructed such that said second diffraction grating means is formed in four regions out of six regions, two regions being located in a center of said diffraction element and two regions being located at both ends of said diffraction element; and
   said first diffraction grating means being formed in two regions located in the vicinity of both ends of said diffraction element not containing said second diffraction grating means.

5. The diffraction element as claimed in claim 2 wherein said diffraction element comprises five regions formed in the same plane separate from each other;
   said diffraction element being constructed such that said second diffraction grating means is formed in two regions located in a vicinity of one end of said diffraction element and in two regions located in a vicinity of a center of said diffraction element; and
   said first diffraction grating means being formed in one region located in a vicinity of an end of said diffraction element opposite said one end.

6. The diffraction element as claimed in claim 2 wherein the light receiving element comprises a photodetector having a plurality of photodetecting sections which are separate from each other; and
   said plurality of photodetecting sections corresponding to a plurality of independent regions of said diffraction element.

7. The diffraction element as claimed in claim 6 wherein the light receiving element comprises a photodetector having five photodetecting sections separate from each other.

8. The diffraction element as claimed in claim 6 wherein the diffraction element being constructed such that transmission factors of said zero order diffracted beam of said first or second diffraction grating means in a region located in a vicinity of both ends of said diffraction element are lower than transmission factors of said first or second diffraction grating means in a region located in a vicinity of a center of the diffraction element; and
   said ends and center being set in a direction corresponding to a direction orthogonal to a track direction of the recording medium.

9. The diffraction element as claimed in claim 8 wherein depths of said second diffraction grating means in said regions located in said vicinity of at least one end of said diffraction element are differentiated from depths of said second diffraction grating means in said regions located in said vicinity of said center of said diffraction element so that said diffraction element has different transmission factors for said zero order diffracted beam passing through said end and said center.

10. The diffraction element as claimed in claim 8 wherein said diffraction element is constructed such that the light beam emitted from the light source passes through a first region having said second diffraction grating means in said diffraction element to produce a zero order diffracted beam which is irradiated upon and reflected from the recording medium;
   a second region having said second diffraction grating means divides said zero order diffracted beam into a zero order diffracted beam and first order diffracted beams; and
   one of said first diffracted beams reaching a parting line between adjacent photodetecting sections in the photodetector, thereby causing a beam spot to properly track along the recording medium according to a surface vibration of the recording medium in order to detect the information stored on the recording medium.

11. The diffraction element as claimed in claim 8 wherein said diffraction element is constructed such that the light beam emitted from the light source passes through a first region having said second diffraction grating means in said diffraction element to produce a zero order diffracted beam which is irradiated upon and reflected from the disk, and then recording medium;
   a second region having said second diffraction grating means divides said zero order diffracted beam reflected from the recording medium into a zero order diffracted beam and first order diffracted beams; and
   one of said first diffracted beams reaching a photodetecting section in the photodetector for detecting the information stored on the recording medium at the photodetecting section.

12. The diffraction element as claimed in claim 8 wherein said diffraction element is constructed such that the light beam emitted from the light source passing through said first diffraction grating means of said diffraction element is divided into a zero order diffracted beam and a positive and a negative first order diffracted beam before being irradiated upon the recording medium and reflected from the recording medium; and
   said second diffraction grating means of said diffraction element dividing the reflected zero order diffracted beam into a zero order diffracted beam and first order diffracted beams before reaching a photodetecting section in the photodetector, thereby causing a beam spot to properly track along a recording track on the recording medium in accordance with said first order diffracted beam received by said photodetecting section.

13. The diffraction element as claimed in claim 8 wherein said diffraction element is constructed such that the light beam emitted from the light source passes through said second diffraction grating means located in a vicinity of at least one end of said diffraction element;
   said second diffraction grating means dividing the light beam to produce a zero order diffracted beam having a decreased luminous intensity; and
   said zero order diffracted beam being guided onto the optical disk to produce reflected beams most of which pass through said first diffraction grating means without diverging to the photodetector.

14. An optical head device for reading information stored in a recording medium by utilizing a light beam from a light source which converges onto a recording medium and is reflected from the recording medium to be received by a light receiving element to read information stored on the recording medium, comprising:
   a diffraction element for guiding the beam reflected from the recording medium to the light receiving element; and
   a first diffraction grating disposed at a light source side of an optical path of the light beam;

said diffraction element including a second diffraction grating divided into a plurality of regions by at least one parting line which extends in a direction corresponding to a direction orthogonal to a track direction of the recording medium and by at least one parting line which extends in a direction corresponding to a direction of an alignment of pits in the recording medium;

said diffraction element being constructed such that transmission factors of a zero order diffracted beam passing through said second diffraction grating located in a vicinity of both ends of said diffraction element are lower than transmission factors of a zero order diffracted beam passing through said second diffraction grating located in a vicinity of a center of said diffraction element;

said ends and center being set in a direction corresponding to a direction orthogonal to a track direction of the recording medium.

15. The optical head device as claimed in claim 14 wherein said second diffraction grating formed in said diffraction element is divided into six regions by said parting line which extends in a direction corresponding to said direction orthogonal to a track direction of the recording medium and two parting lines which extend in a direction corresponding to said direction of the alignment of the pits in the recording medium.

16. The optical head device as claimed in claim 14 wherein said second diffraction grating formed in said diffraction element is divided into nine regions by two parting lines which extend in a direction corresponding to said direction orthogonal to a track direction of the recording medium and two parting lines which extend in a direction corresponding to said direction of the alignment of the pits in the recording medium.

17. The optical head device as claimed in claim 14 wherein the light receiving element comprises a photodetector including a plurality of photodetecting sections separate from each other;

said plurality of photodetecting sections corresponding to a plurality of independent regions in said diffraction element.

18. The optical head device as claimed in claim 17 wherein said plurality of photodetecting sections is five independent sections.

19. The optical head device as claimed in claim 17 wherein said diffraction element is constructed such that the light beam emitted from the light source is divided into a zero order diffracted beam and a pair of first order diffracted beams by said first diffraction grating passes through said second diffraction grating before being irradiated onto the recording medium to produce reflected beams;

said second diffraction grating also receiving the reflected beam and producing a first order diffracted beam from said zero order diffracted beam and guiding onto adjacent photodetecting sections of the photodetector, thereby causing a beam spot to properly track along the recording medium in accordance with a surface vibration of the recording medium; and said second diffraction grating guiding said first order diffracted beams onto two photodetecting sections of the photodetector to detect tracking errors.

20. The optical head device as claimed in claim 17 wherein said diffraction element is constructed such that the light beam emitted from the light source passes through a certain region of said second diffraction grating after being divided into a zero order diffracted beam and a pair of first order diffracted beams by said first diffraction grating before being irradiated onto and reflected from the recording medium;

said second diffraction grating also receiving the reflected zero order diffracted beam at a region different from said certain region and dividing the reflected zero order diffracted beam into a zero order diffracted beam and first order diffracted beams wherein one of said first order diffracted beams reaches a photodetecting section in the photodetector to enable detection of information stored on the recording medium; and said second diffraction grating further receiving the reflected first order diffracted beams at a region different from said certain region and guiding the reflected beams into two photodetecting sections, thereby causing a beam spot to properly track along a recording track on the recording medium.

21. The optical head device as claimed in claim 14 wherein a depth of said second diffraction grating in said regions located in said vicinity of both ends of said diffraction element is differentiated from a depth of said second diffraction grating in said regions located in said vicinity of said center of said diffraction element such that said diffraction element has different transmission factors for said zero order diffracted beam passing through said ends and said center.

22. An optical head device for reading information stored in a recording medium by utilizing a light beam from a light source which converges onto the recording medium and reflects from the recording medium to be received by a light receiving element thereby to read information stored on the recording medium, comprising:

a diffraction element positioned between the light source and the recording medium;

said diffraction element including, a first diffraction grating for dividing the light beam from the light source into a zero order diffracted beam utilized for reading the information stored on the recording medium and a pair of first order diffracted beams utilized for reading tracking errors, and a second diffraction grating for guiding the beam reflected from the recording medium to the light receiving element;

said zero order diffracted beam passing through a vicinity of both ends of said second diffraction grating having transmission factors which are lower than transmission factors of said zero order diffracted beams passing through a vicinity of a center of said second diffraction grating;

said center and ends being set in a direction corresponding to a direction orthogonal to a track direction of the recording medium.

23. The optical head device as claimed in claim 22 wherein said second diffraction grating includes a plurality of regions separate from each other.

* * * * *